June 2, 1931. W. T. ROONEY 1,808,683
SWITCH FOR DIRECTION SIGNALS
Filed June 7, 1924    3 Sheets-Sheet 3
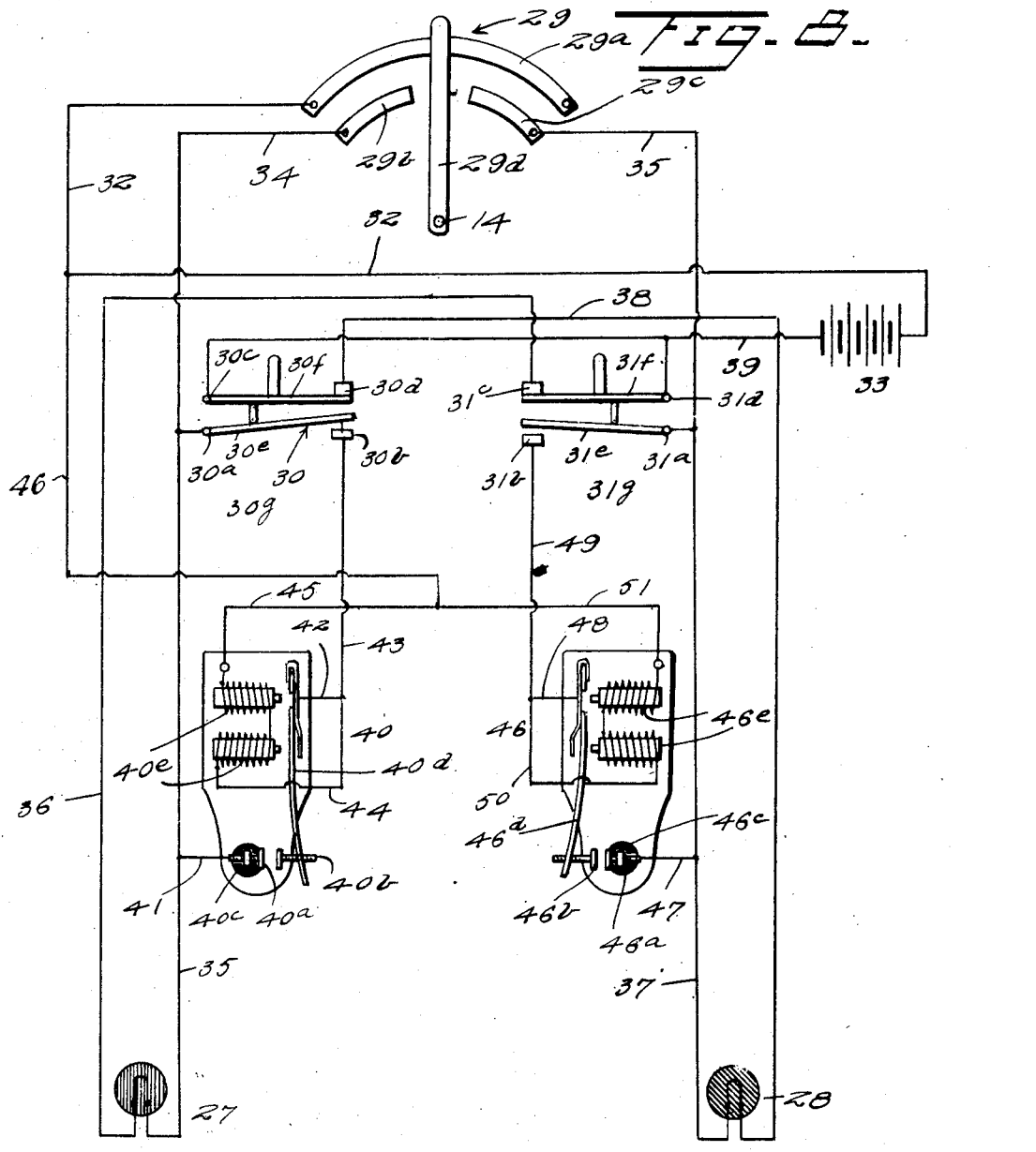
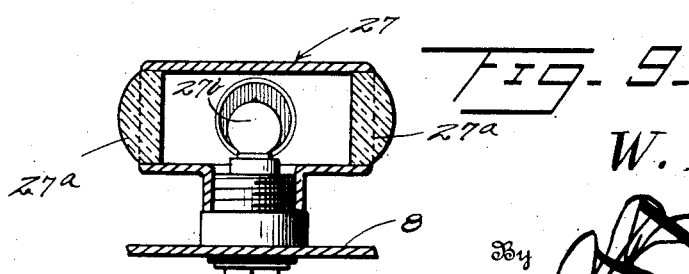
Inventor
W. T. Rooney.
By
Attorney Patented June 2, 1931

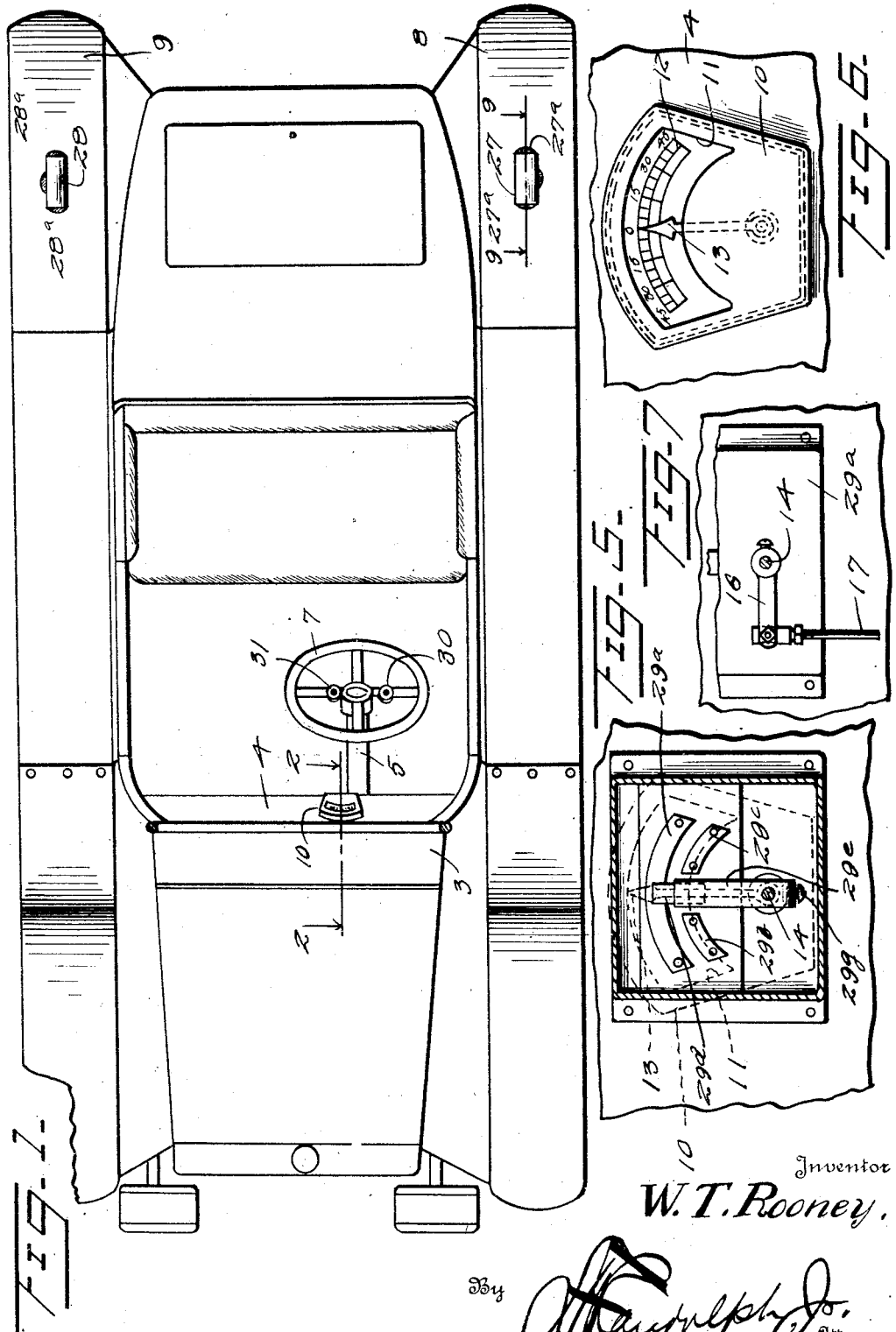

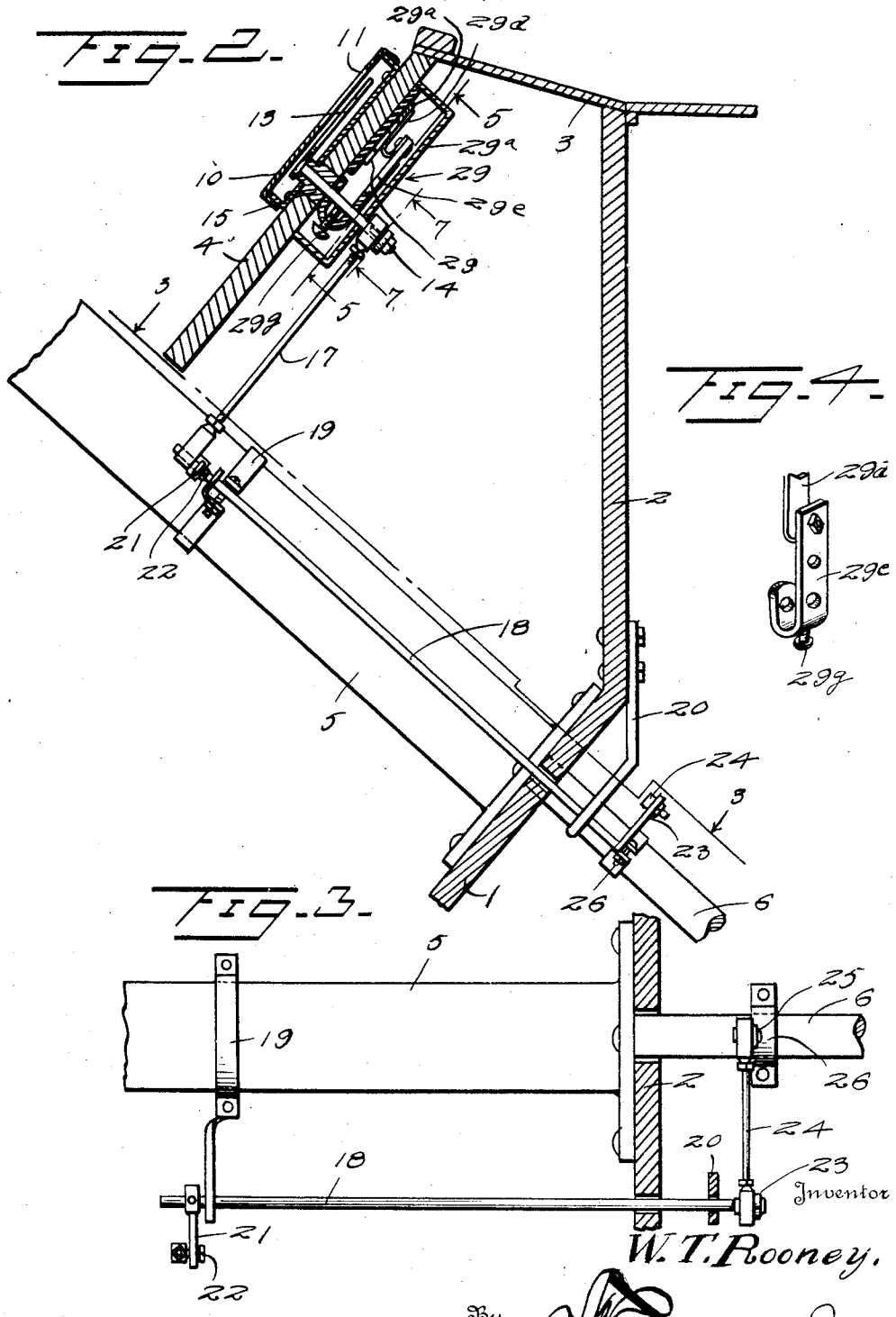

1,808,683

UNITED STATES PATENT OFFICE

WILLIAM T. ROONEY, OF LOS ANGELES, CALIFORNIA

SWITCH FOR DIRECTION SIGNALS

Application filed June 7, 1924. Serial No. 718,514.

This invention relates to improvements in direction indicating signals for automobiles, and has for its primary object to improve and simplify devices of this character and to provide one adapted to be automatically operated by the steering mechanism of an automobile so as to indicate the direction in which the automobile is about to be turned.

A further object of the invention is the provision of a signal of the character stated adapted to be also manually operated so that the direction in which the automobile is to be turned may be indicated at any desired or required distance from the point at which the turn is to be made.

A still further object of the invention is the provision of a signal of the character stated which shall be especially adapted for use in connection with the front wheel angle indicator forming the subject-matter of Patent No. 1,471,209, granted October 16, 1923, to the end that it may be automatically operated to indicate the direction in which the automobile is about to be turned.

With the above and other objects in view, the invention consists in the construction, combination and arrangement of parts hereinafter fully described and claimed, and illustrated in the accompanying drawings, wherein:

Figure 1 is a top plan view of an automobile equipped with the direction indicating signal and the front wheel angle indicator, Figure 2 is a detail sectional view taken on the vertical plane indicated by the line 2—2 of Figure 1, Figure 3 is a detail sectional view taken on the plane indicated by the line 3—3 of Figure 2, Figure 4 is a detail perspective view of the blade of the automatically operated switch of the direction indicating signal, Figure 5 is a sectional view of the automatically operated switch, the section being taken on the plane indicated by the line 5—5 of Figure 2, Figure 6 is a detail view in front elevation of the dial of the front wheel angle indicator, Figure 7 is a detail sectional view taken on the plane indicated by the line 7—7 of Figure 2, Figure 8 is a diagrammatic view on the direction indicating signal, and Figure 9 is a detail sectional view of one of the signal lamps, the section being taken on the plane indicated by the line 9—9 of Figure 1.

Referring to the drawings by reference numerals, 1 designates the toe board, 2 the dash, 3 the cowl, 4 the instrument board, 5 the steering column, and 6 the steering rod or shaft of an automobile. The steering wheel is designated 7, left rear fender 8, and the right rear fender 9.

The front wheel angle indicator comprises a casing 10 which is secured to the instrument board 4 at a point near the steering column 5 and which is provided in its front wall with a sight opening 11. The back wall of the casing 10 constitutes a dial and is provided with suitable graduations 12 which are calibrated uniformly from a central point which corresponds with the zero of the scale so that the corresponding angles may be correctly indicated to the right and left of the zero, accordingly as the front wheels of the automobile are turned to the right or left. A pointer or hand 13 is secured to a shaft 14 mounted in a bearing 15 carried by the instrument board 4. An arm 16 projecting laterally from the shaft 14 is connected by means of a rod 17 with the steering gear of the automobile, whereby movement of the front wheels of the automobile will effect a corresponding movement of the pointer or hand 13 which, in conjunction with the scale 12, indicates the angle of the front wheels and whether they are turned to the right or to the left. When the front wheels are straight ahead, the pointer or hand 13 is opposite the zero indication of the scale 12, and when the wheels are turned to the right or left, the pointer or hand 13 correspondingly moves to the right or left of the zero indication of the scale 12.

The pointer or hand 13 may be operated to indicate the position of the front wheels of the automobile by connecting the rod 17 to the steering lever arm in the manner shown in Figure 6 in the hereinbefore identified patent, or by connecting it to the steering rod or shaft 6 as shown in the accompanying drawings and also in said patent. The means by which the rod 17 is connected to the steering shaft 6 comprises a shaft 18 journaled at one side of the steering column 5 in a bearing bracket 19 carried by said steering column and in a bearing bracket 20 carried by the dash 2. At its upper end the shaft 18 is provided with an arm 21 to which the lower end of the rod 17 is pivoted as at 22. The lower end of the shaft 18 is provided with an arm 23 to which one end of the link 24 is secured. The other end of the link 24 is secured to an arm 25 which is in turn secured to the steering shaft 6 by a bracket 26.

From the foregoing description, taken in connection with Figures 2, 3, 6 and 7, it should be apparent that the connection between the steering shaft 6 and the hand or pointer 13 is such that the latter will register with the zero mark of the scale 12 when the front wheels of the automobile are in alinement with the rear wheels and such that when the front wheels are turned either to the right or left the hand or pointer 13 will move over the scale 12 in a corresponding direction.

In accordance with the present invention, the automobile is equipped with electric lamps 27 and 28 which are secured to the rear fenders 8 and 9 in the manner indicated in Figures 1 and 9. Each of the lamps 27 and 28 comprises a casing open at its front and rear ends. The left hand lamp 27 is provided with front and rear lenses $27^a$ which are preferably red, and the right hand lamp 28 is provided with front and rear lenses $28^a$ which are preferably green, and the lamps are provided with electric bulbs $27^b$ and $28^b$, respectively. If desired, the lamps 27 and 28 may be secured at any other points upon the automobile, the only requirement being that they may be so positioned that they may be readily seen and that the light rays emanating therefrom will be projected forwardly and rearwardly of the automobile. The lamps 27 and 28 are under the control of an automatic switch 29 secured to the instrument board 4 and a manually operable left hand switch 30 and a manually operable left hand switch 31 mounted upon the steering wheel 7.

As shown in Figures 2 and 8, the automatic switch 29 comprises a contact strip $29^a$ connected by a wire 32 to one side of a battery 33, a contact strip $29^b$ connected by a wire 34 to the contact $30^a$ of the manually operable switch 30, and a contact strip $29^c$ connected by a wire 35 to the contact $31^a$ of the manually operable switch 31. The automatic switch 29 also comprises a blade $29^d$ which is carried by an arm $29^e$ secured to the shaft 14 by a set screw $29^f$. The blade $29^d$ is arranged in parallel relation with the hand or pointer 13, and due to its connection with the shaft 14 moves in unison with the hand or pointer 13 with the result that when the front wheels of the automobile are in alinement with the rear wheels the blade $29^d$ will occupy a position between the relatively spaced adjacent ends of the contact strips $29^b$ and $29^c$. When the wheels are turned to the right, the blade $29^d$ will bridge the contact strips $29^a$ and $29^b$ and close the circuit of the lamp 27. When the front wheels of the automobile are turned to the right the blade $29^d$ will bridge the contact strips $29^a$ and $29^c$ and close the circuit of the lamp 28. As shown in Figure 2, the automatic switch 29 is housed by a casing $29^a$.

The manually operable switches 30 and 31 are of the double trip push button type. In addition to the contact $30^a$, the manually operable switch 30 includes the contacts $30^b$, $30^c$ and $30^d$, a blade $30^e$ adapted to bridge the contacts $30^a$ and $30^b$, and a blade $30^f$ adapted to bridge the contacts $30^c$ and $30^d$. A spring $30^g$ is adapted to normally hold the blade $30^e$ in circuit breaking position and the blade $30^f$ in circuit closing position. The manually operable switch 31 includes in addition to the contacts $31^a$, contacts $31^b$, $31^c$ and $31^d$, a blade $31^e$ adapted to bridge the contacts $31^a$ and $31^b$, and a blade $31^f$ adapted to bridge the contacts $31^c$ and $31^d$. The blade $31^e$ is normally held in circuit breaking position and the blade $31^f$ in circuit closing position by a spring $31^g$. A wire 35 leads from the contact $30^a$ to one side of the lamp 27, and a wire 36 leads from the contact $31^c$ to the other side of this lamp. A wire 37 leads from the contact $31^a$ to one side of the lamp 28, and a wire 38 leads from the contact $30^d$ to the other side of this lamp. A wire 39 is connected to the other side of the battery 33 and to the contacts $31^d$ and $30^c$.

When the switch blade $29^d$ is in position to bridge the contact strips $29^a$ and $29^b$, due to the turning of the front wheels of the automobile to the left, the circuit of the lamp 27 will be closed. This circuit comprises the battery 33, the wire 32, the contact strip $29^a$, the blade $29^d$, the contact strip $29^b$, the wires 34 and 35, the lamp 27, the wire 36, the blade $31^f$, and a wire 39. When the switch blade $29^d$ is in position to bridge the contact strips $29^a$ and $29^c$, due to the turning of the front wheels of the automobile to the right, the circuit of the lamp 28 will be closed. This circuit includes the battery 33, the wire 32, the contact strip $29^a$, the blade $29^d$, the contact strip $29^c$, the wires 35 and 37, the lamp 28, the wire 38, the blade $30^f$, and the wire 39.

An electro-magnetic switch 40, which is under the control of the manually operable switch 30, includes a stationary contact $40^a$ and a movable contact $40^b$. The stationary contact $40^a$ is carried by a block of insulation $40^c$, and it is connected to one side of the lamp 27 by the wires 35 and 41. The movable contact 40$^b$ is carried by a spring 40$^d$ and is normally held spaced from the stationary contact 40$^a$ thereby, and it is connected to the contact 30$^b$ of the manually operable switch 30 by wires 42 and 43. The switch 40 also includes a pair of electro-magnets 40$^e$ which are connected by a wire 44 to the wire 43 and which are connected to the wire 32 by wires 45 and 46. When the manually operable switch 30 is depressed, with the result that the blade 30$^e$ is moved into circuit closing position and the blade 30$^f$ into circuit breaking position, a circuit including the lamp 27 and electro-magnetic switch 40 is closed. The circuit includes the battery 33, the wires 32, 46, and 45, the windings of the magnets 40$^e$, the wires 44 and 43, the blade 30$^e$, the wire 35, the lamp 27, the wire 36, the blade 31$^f$ and the wire 39. The closing of the circuit, in addition to illustrating the lamp 27, energizes the electro-magnets 40$^e$ with the result that the contact 40$^b$ is moved into engagement with the contact 40$^a$, closing the third circuit of the lamp 27. This circuit includes the battery 33, the wires 32, 46 and 45, the windings of the electro-magnets 40$^e$, the wires 44 and 42, the spring 40$^d$, the contacts 40$^b$, and 40$^a$, the wires 41, 35 and 36, the switch blade 31$^f$ and the wire 39. This circuit remains closed after the manually operable switch 30 is released and until the manually operable switch 31 is depressed to close the circuit of the lamp 28 or the automatic switch 29 closes the circuit of this lamp or the lamp 27.

An electro-magnetic switch 46 which is under the control of the manually operable switch 31 and which is similar to the electro-magnetic switch 40, includes a stationary contact 46$^a$ and a movable contact 46$^b$. The stationary contact 46$^a$ is carried by a block of insulation 46$^c$, and the movable contact 46$^b$ is carried by a spring 46$^d$ which normally holds it in spaced relation to the stationary contact 46$^a$. A pair of electro-magnets 46$^e$ is adapted when energized to move the contact 46$^b$ into circuit closing position with respect to the contact 46$^a$. A wire 47 connects the stationary contact 46$^a$ to the wire 37. Wires 48 and 49 connect the movable contact 46$^b$ to the contact 31$^b$ of the manually operable switch 31. A wire 50 is connected to the windings of the electro-magnets 46$^e$ and to the wire 49, and a wire 51 is connected to the windings of the electro-magnets 46$^e$ and to the wire 46. When the manually operable switch 31 is depressed with the result that its blade 31$^e$ is moved into circuit closing position and its blade 31$^f$ into circuit breaking position, a circuit including the lamp 28 and electro-magetic switch 46 is closed. This circuit includes the battery 33, the wires 32, 46 and 51, the windings of the electro-magnets 46$^e$, the wires 50 and 49, the blade 31$^e$, the wire 37, the lamp 28, the wire 38, the blade 30$^f$, and the wire 39. The closing of this circuit, in addition to illuminating the lamp 28, energizes the electro-magnets 46$^e$ with the result that the contact 46$^b$ is moved into engagement with the contact 46$^a$, closing the third circuit of the lamp 28. This circuit includes the battery 33, the wires 32, 46 and 51, the windings of the electro-magnets 46$^e$, the wires 50 and 48, the spring 46$^d$, the contacts 46$^b$ and 46$^a$, the wires 47, 37, 38, the blades 30$^f$, and the wire 39.

From the foregoing description, taken in connection with the accompanying drawings, it should be apparent that when the front wheels of the automobile are in alinement with the rear wheels and the manually operable switches 30 and 31 are in normal position, neither of the lamps 27 and 28 is lighted. Should however the front wheels of the automobile be turned, either the lamp 27 or 28 will be lighted, depending upon whether the front wheels are turned to make a left or right turn. The adjacent ends of the contact strips 29$^b$ and 29$^c$ are spaced far enough apart to permit the course of the automobile to be slightly altered without lighting either of the lamps 27 or 28. When it is desired to indicate the direction in which the automobile is to be turned at any desired or required distance from the point at which the turn is to be made, either the manually operable switch 30 or the manually operable switch 31 is depressed, resulting in the lighting of the lamp controlled by the switch depressed. After the switch is depressed it may be released without extinguishing the lamp lighted due to the action of the electro-magnetic switch. The lamp lighted will be automatically extinguished after the automobile has been turned and the front wheels righted far enough to move the switch blade 29$^d$ into position between the contact strips 29$^b$ and 29$^c$.

It should be understood that the drawings are merely illustrative and do not pretend to give exact proportions. Furthermore, the said drawings are illustrative of a preferred construction, it being my expectation that various changes and modifications may be made without departing from the spirit and scope of the invention.

What is claimed is:—

1. A device of the class described comprising a mounting member, a shaft journaled therein, a U-shaped arm having one leg longer than the other, said shaft passing through said legs with the shorter leg in contact with the mounting member, means to secure the arm in said position on the shaft, said arm having a contact on its longer leg so that the same will function as a switch arm.

2. A device of the class described comprising a mounting member, a shaft journaled therein, a U-shaped arm, said shaft passing through the legs of said arm with one of them in contact with the mounting member, means to secure the arm in said position on the shaft, and said arm being a conductor whereby it functions as a switch arm.

In testimony whereof I affix my signature.

WILLIAM T. ROONEY.